United States Patent
Budrys

(12) 
(10) Patent No.: US 6,618,078 B1
(45) Date of Patent: Sep. 9, 2003

(54) DIGITAL CAMERA CAPABLE OF PRINTING CAPTURED IMAGES IN VARIOUS SIZES

(75) Inventor: Audrius J. Budrys, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/062,023

(22) Filed: Apr. 17, 1998

(51) Int. Cl.[7] .......................... H04N 9/04; H04N 5/228
(52) U.S. Cl. ..................... 348/207.99; 348/207.2; 346/143; 347/109; 347/119
(58) Field of Search .................... 346/143; 347/109, 347/119; 348/207.2, 207.99

(56) References Cited

U.S. PATENT DOCUMENTS

| | | | | |
|---|---|---|---|---|
| 4,074,324 A | * | 2/1978 | Barrett | 358/296 |
| 4,574,317 A | * | 3/1986 | Scheible | 235/432 |
| 4,827,347 A | * | 5/1989 | Bell | 348/231.7 |
| 4,937,676 A | * | 6/1990 | Finelli et al. | 348/360 |
| 4,949,283 A | * | 8/1990 | Yamauchi et al. | 346/143 |
| 5,012,349 A | * | 4/1991 | de Fay | 346/143 |
| 5,311,208 A | * | 5/1994 | Burger et al. | 345/157 |
| 5,493,409 A | * | 2/1996 | Maeda et al. | 347/218 |
| 5,633,489 A | * | 5/1997 | Dvorkis et al. | 235/462.43 |
| 5,686,720 A | * | 11/1997 | Tullis | 235/462.42 |
| 5,927,872 A | * | 7/1999 | Yamada | 400/88 |
| 5,988,900 A | * | 11/1999 | Bobry | 346/143 |
| 6,229,565 B1 | * | 5/2001 | Bobry | 348/207.99 |
| 6,281,882 B1 | * | 8/2001 | Gordon et al. | 345/166 |
| 6,486,875 B1 | * | 11/2002 | O'Donnell, Jr. | 345/179 |

* cited by examiner

*Primary Examiner*—Wendy R. Garber
*Assistant Examiner*—James Hannett

(57) ABSTRACT

A method and apparatus for capturing and printing an image of a subject utilizes a tracking mechanism to allow an operator to print the captured image onto a selected surface by manually manipulating the apparatus across the surface. The apparatus is a print-capable digital camera which can print the captured image in one of a range of sizes. The printing process involves an operator placing the digital camera on the surface and scanning the surface in order for the digital camera to print a segment of the captured image according to the location of the digital camera. The tracking mechanism may be comprised of two trackball assemblies. The rotations of the trackballs generate location data which is utilized by digital signal processing circuitry to determine the position of the digital camera relative to a start-print position. Once the location of the inkjet printing head is determined, the digital signal processing circuitry arranges print data to drive an inkjet cartridge to deposit droplets of ink to form a particular segment of the captured image. The digital camera also includes an optical lens for receiving the image of the subject. The optical lens is optically coupled to an application specific integrated circuit (ASIC). The ASIC contains a photosensor array, analog-to-digital circuitry, a printer driver, timing control circuitry, a memory, and digital signal processing circuitry. A control interface is also included to allow the operator to control functions of the digital camera.

13 Claims, 6 Drawing Sheets

DIGITAL CAMERA CAPABLE OF PRINTING CAPTURED IMAGES IN VARIOUS SIZES

TECHNICAL FIELD

The invention relates generally to digital cameras and more particularly to a digital camera with printing capability.

BACKGROUND ART

A digital camera captures an image of a particular subject using an imaging system that includes an optical lens and a photosensor array, such as a charged coupled device (CCD). The imaging system "captures" a set, or frame, of digital image data that represents a particular subject at the time that the frame is captured. Each frame of digital image data is stored in a memory of the digital camera for subsequent viewing on a display or downloading to a computer system for editing and printing.

In order to print the captured image, a host computer is typically utilized. The frame of digital image data is transferred from the digital camera to the host computer. Once the frame of digital image data has been received, the host computer can display the captured image represented by the frame of digital image data on a monitor using photo-manipulation software. The host computer can then print the captured image to any standard printer, or a special photography printer, such as the Hewlett Packard (HP) PhotoSmart Photo Printer, that is attached to the host computer. However, this typical approach requires access to a host computer and the sophistication to utilize the photo-manipulation software.

An alternative photo-printing approach is to employ a dedicated printer that is directly connected to a digital camera. U.S. Pat. No. 4,074,324 to Barrett describes an instant electronic camera that is directly connected to an external mechanical scanning printer. If digital image data is captured at a location distant from the printer, the camera must be brought to the location of the printer in order to print the image data.

Similarly, U.S. Pat. No. 4,827,347 to Bell describes an electronic camera that is directly connected to a database/picture printer. Unlike the instant electronic camera of Barrett, the electronic camera of Bell has an array of display windows on the opposite side of a lens assembly for viewing stored frames of digital image data prior to printing or downloading.

Still another approach to printing the frame of digital image data is to have a printer that is incorporated into the digital camera or is attached physically to a camera housing of the digital camera. U.S. Pat. No. 4,937,676 to Finelli et al. (hereinafter Finelli) describes an electronic camera system with a detachable printer. The detachable printer of Finelli utilizes a self-developing film that is exposed according to the digital image data. Thus, photo-imageable film is required to print an image. Moreover, the system described in Finelli offers little flexibility with respect to photograph manipulation (e.g., varying the size of a photo-print).

U.S. Pat. No. 5,493,409 to Maeda. et al. (hereinafter Maeda) describes a still video camera having a printer. In one embodiment, a printing mechanism is incorporated into a still video camera. In this embodiment, a television set is utilized to view the electronic images. In another embodiment, a printing mechanism is a detachable printer unit. In both embodiments, the captured image can only be printed in one size.

While the known devices for capturing and printing images operate well for their intended purpose, an efficient and inexpensive camera for capturing and printing frames of digital image data in various sizes is desired. What is needed is a compact digital camera with printing capability that could print the frame of digital image data onto any of a variety of types of print media and preferably within a range of different sizes.

SUMMARY OF THE INVENTION

A method and apparatus for capturing and printing an image includes utilizing a tracking mechanism to allow an operator to print the captured image onto a selected print medium by moving the apparatus in a free-hand manner across a print medium. The changing location of the apparatus is monitored in real time using navigation information generated by the tracking mechanism. The apparatus is a print-capable digital camera having conventional circuitry for capturing an image, but also having a printing capability that is controlled by the navigation information generated by the tracking mechanism.

In the preferred embodiment, the tracking mechanism is at least one trackball that extends beyond an external surface of the digital camera. Also in the preferred embodiment, the printing capability is achieved by locating a printhead of an inkjet cartridge at the external surface. Rotation of the trackball or trackballs is monitored in real time to generate the navigation information that allows determination of the position of the inkjet printhead relative to a start position for the printing process. While inkjet printing is preferred, other printing devices may be utilized.

In operation, a frame of digital image data is captured and stored using conventional techniques. During a printing process, the frame of image data is converted to print data compatible with the printing device. The print data is dynamically arranged in segments in response to receiving the navigation information. For example, if two trackball assemblies generate navigation information, the location of the printhead may be determined within X, Y coordinates, and segments of the print data may be transmitted to the printhead accordingly. As long as the trackball assemblies are in constant contact with the surface on which the image is printed, the digital camera may retrace any missed areas in order to complete the print image. Preferably, the digital camera prints only the missed area when there is an overlap, but duplicate printing may be utilized.

Rather than trackball assemblies, the navigation information may be generated by an optical imaging structure. For example, during a printing process, images of the surface on which the print material is deposited may be repeatedly captured and compared to each other to determine the direction of movement by the digital camera. Successive determinations are used to arrange the print data for forming the image of interest on a print medium, such as a sheet of paper.

The digital camera may include an optical lens for optically focusing an image onto an array of elements that generate output signals indicative of light received at a selected time. Collectively, the signals form a frame of image data. In the preferred embodiment, the imaging array is fabricated as part of an application specific integrated circuit (ASIC) that also includes analog-to-digital circuitry, timing control circuitry, memory and digital signal processing circuitry. Also included on the ASIC is a printer driver, which is typically implemented in computer software. The dynamic arrangement of segments of print data may be implemented at the driver level, or at a level above or below the driver level. That is, the printer driver may direct print data in an arrangement of segments responsive to the reception of navigation information. Alternatively, the dynamic arrangement of segments may be implemented prior to the printer driver by arranging the image information that is conducted to the printer driver. As the third alternative, the print data from the driver may be temporarily stored in a buffer, and the dynamic arrangement may be the result of extracting print data from the buffer in an arrangement dictated by the navigation information.

Preferably, the printer driver enables a user to select the size of the image that is printed. The digital camera includes an interface that allows magnification and demagnification of the image to be printed.

DETAILED DESCRIPTION

Figure 1:
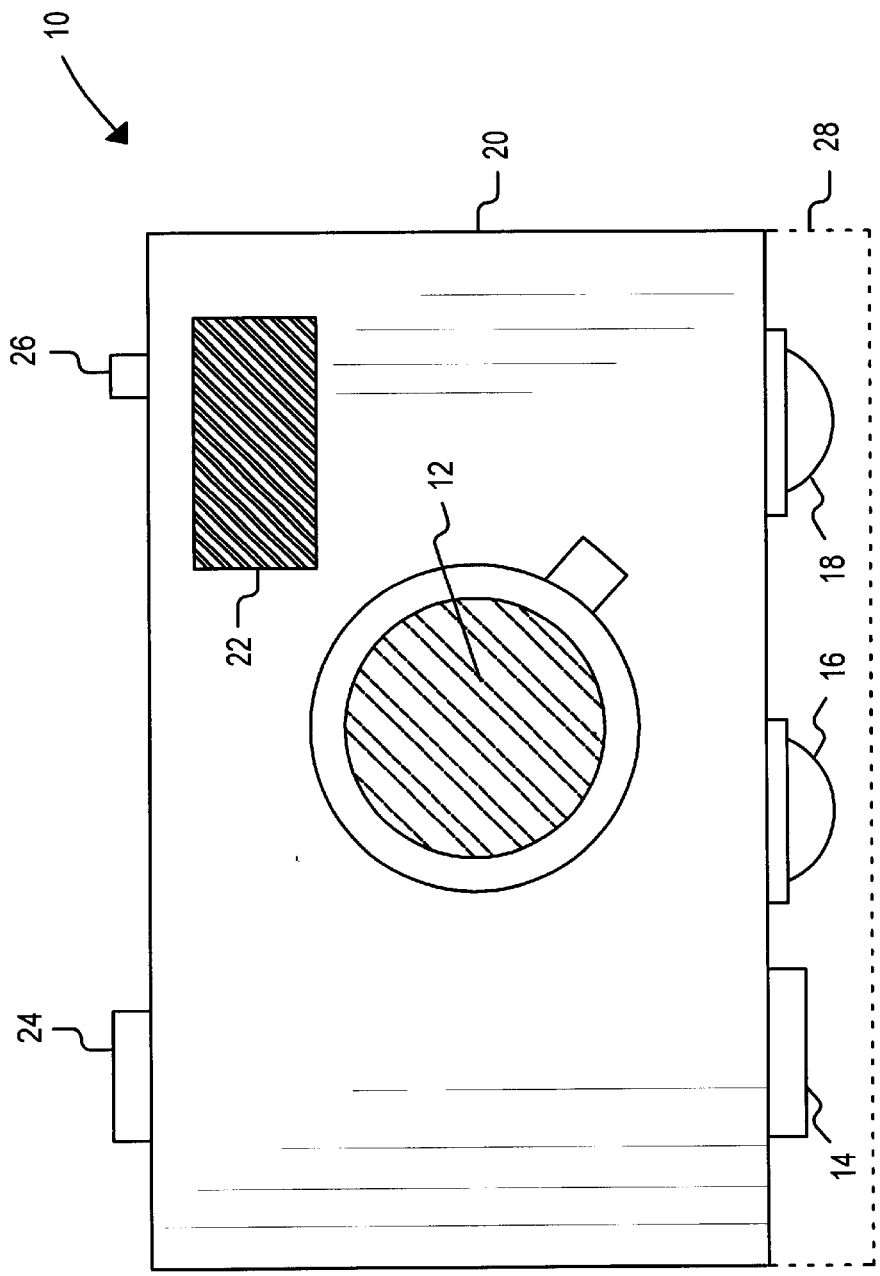
FIG. 1 is an illustration of a digital camera capable of printing a captured image in various sizes in accordance with the invention.

With reference to FIG. 1, a print-capable digital camera 10 having a camera housing 20 is shown. On the front portion of the digital camera 10, an optical lens 12 and a flash device 22 are incorporated into the camera housing 20. Print button 24 and capture button 26 are located on the top of the digital camera 10. Also shown in FIG. 1 are an inkjet printing head 14 and two trackballs 16 and 18 located on the bottom of the digital camera 10. The inkjet printing head 14 and the two trackballs 16 and 18 can be covered by attaching a printer case 28 (shown in phantom) to the camera housing 20.

Figure 2:
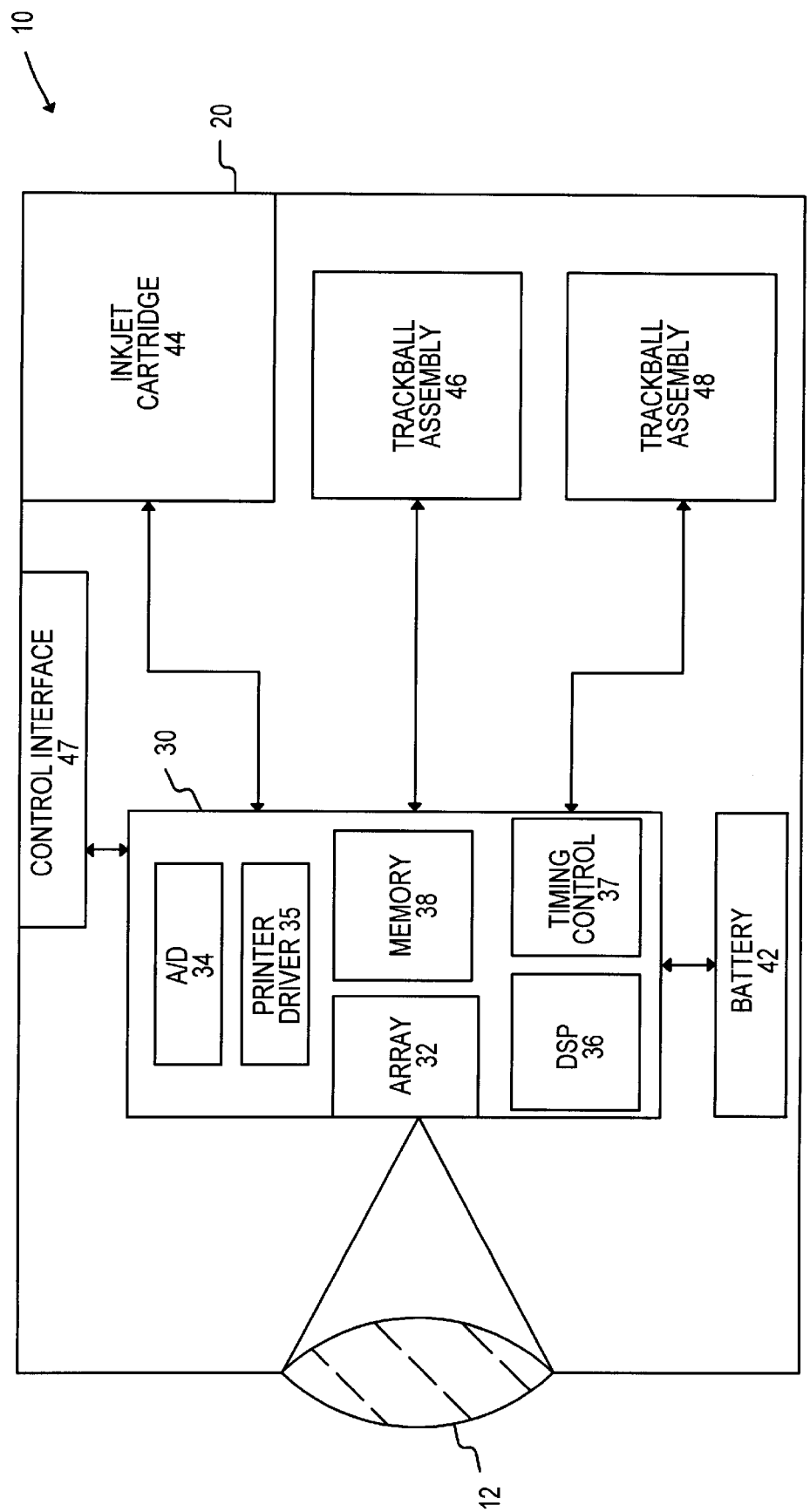
FIG. 2 is a block diagram of the components of the print-capable digital camera.

Additional components of the print-capable digital camera 10 are shown in FIG. 2. Optically coupled to the optical lens 12 is an application specific integrated circuit (ASIC) 30. The ASIC 30 includes a photosensor array 32, analog-to-digital circuitry 34, a printer driver 35, timing control circuitry 37, memory 38, and digital signal processing circuitry 36. The ASIC 30 utilizes complementary metal-oxide semiconductor (CMOS) technology. As such, the photosensor array 32 is comprised of CMOS sensors. Compared to charged couple devices (CCDs), CMOS sensors are less expensive and easier to fabricate. In addition, CMOS sensors require less power than CCDs.

In an alternative embodiment, the memory 38 is contained in a detachable memory card. The memory card can interface with a host computer for downloading any stored information to the memory card.

The configuration of the ASIC 30 is not crucial to the present invention. The photosensor array 32, the analog-to-digital circuitry 34, the timing control circuitry 37, the memory 38, and the digital signal processing circuitry 36 may each, or in any combination thereof, be incorporated on separate integrated circuits. The photosensor array 32 may be a CCD instead of CMOS sensors. As is well known in the art, the functions of a printer driver 35 are implemented primarily in computer programming.

The inkjet cartridge 44, which is electrically controlled by the ASIC 30, is also shown in FIG. 2. The inkjet printing head 14 shown in FIG. 1 is a part of the inkjet cartridge 44. The inkjet cartridge 44 may be a commercially available inkjet cartridge, such as the one utilized in the Hewlett Packard DeskJet 400 manufactured by the assignee of the present invention. However, the inkjet cartridge 44 may be a miniature version of a conventional inkjet cartridge in order to minimize the size of the print-capable digital camera 10. Although a black inkjet cartridge could be used, the preferred embodiment utilizes a miniature color inkjet cartridge to produce color pictures of the captured images.

Control interface 47 located at a surface of the camera housing 20 allows an operator to control most of the functions of the print-capable digital camera 10. Control interface 47 may include an on/off switch, a battery status readout, and a controller for lens focus, exposure, shutter speed, and white balance. Printing controls included in the control interface 47 may comprise a controller for selecting stored images to be printed and selecting a print size of the image. The control interface 47 may also include a display device for viewing a captured image almost instantaneously.

First trackball assembly 46 and second trackball assembly 48 are electrically coupled to the ASIC 30. First trackball assembly 46 includes trackball 16 shown in FIG. 1, while second trackball assembly 48 includes trackball 18. The trackballs 16 and 18 should be made of rubber or other non-skidding material. The trackball assemblies 46 and 48 also include a detection mechanism for monitoring the rotations of the trackballs 16 and 18. The detection mechanism may include two rollers, such as the rollers utilized in a conventional computer mouse, that are in constant contact with the trackball 16 or the trackball 18 to monitor movement of the digital camera 10 relative to a recording medium during a printing process. The two trackball assemblies 46 and 48 also monitor the rotation of the printable digital camera 10, or the angle of attack, during the printing process. Although two trackball assemblies 46 and 48 are illustrated in FIG. 2, the invention could operate properly with only one trackball assembly.

Lastly, a battery 42 is contained within the print-capable digital camera 10 to supply power to the electronic components of the digital camera 10. The battery 42 may be more than one conventional alkaline battery, such as AAA size batteries, rechargeable nickel-cadmium batteries, or nickel hydride batteries.

The image capturing operation of the print-capable digital camera 10 will be described with references to FIGS. 1 and 2. The optical lens 12 is directed at a subject of interest. When the capture button 26 is depressed, an electronic shutter is activated and the image of the subject is focused by the optical lens 12 onto the photosensor array 32. The shutter speed and other timing functions are controlled by the timing control circuitry 37. The photosensor array 32 is a matrix of photosensitive pixels. Each photosensitive pixel generates an electrical signal that is representative of the optical energy that is directed at the pixel by the optical lens 12. Since the resolution of an image that can be produced from the photosensor array 32 is dependent upon the density of the pixels in the photosensor array 32, a sufficient number of pixels should be contained in the photosensor array 32 to achieve a desired resolution. The electrical signals that are generated by the photosensor array are characterized as image data or digital image data, wherein each image or "picture" that is captured is considered one "set" or "frame" of digital image data.

Once the image has been captured, the frame of digital image data is processed by the analog-to-digital circuitry 34 and is stored in the memory 38. The frame of digital image data may conduct through the digital signal processing circuitry 36 prior to reaching the memory 38. The digital signal processing circuitry 36 may be used to enhance and compress the frame of digital image data prior to storage in the memory 38.

Figure 3:
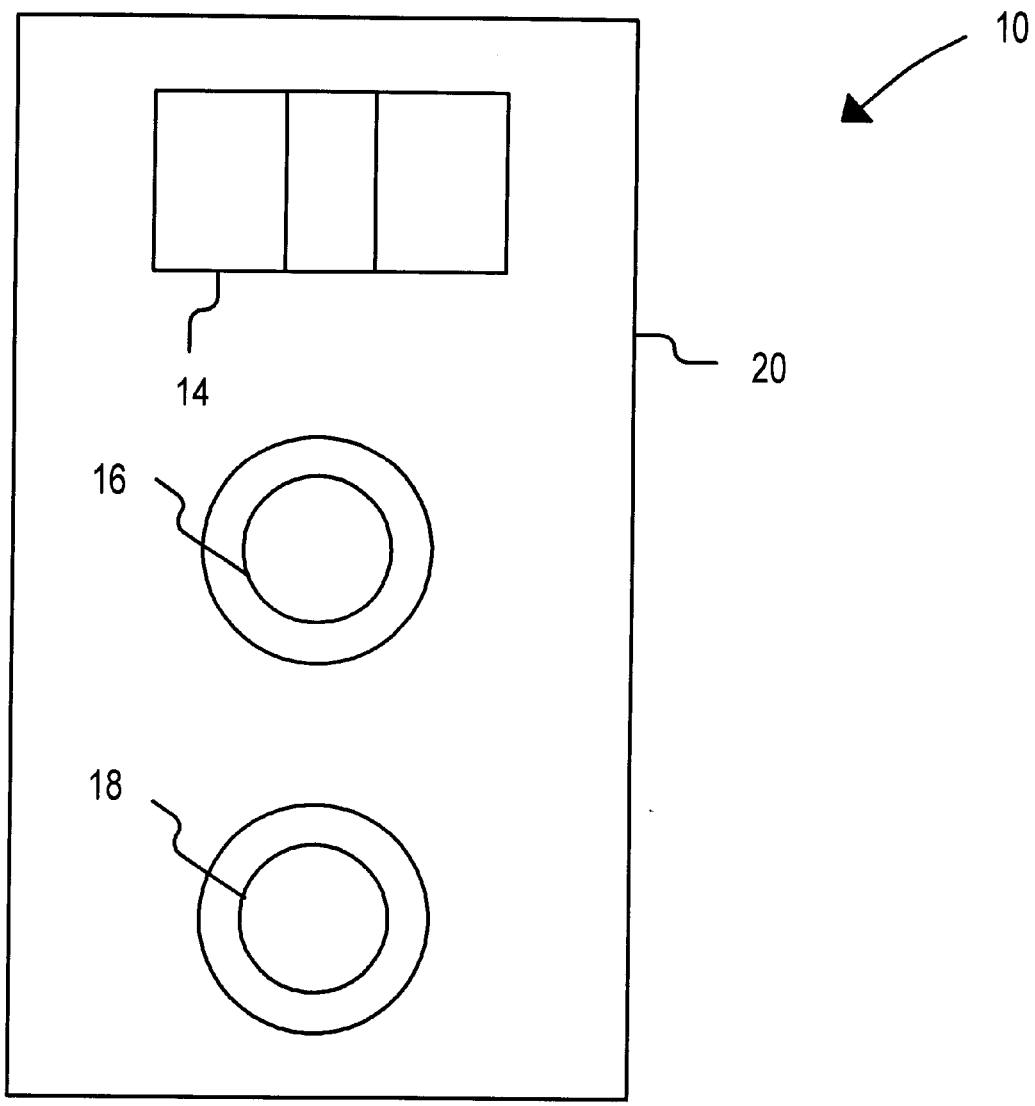
FIG. 3 is a bottom view of the digital camera.
Figure 4:
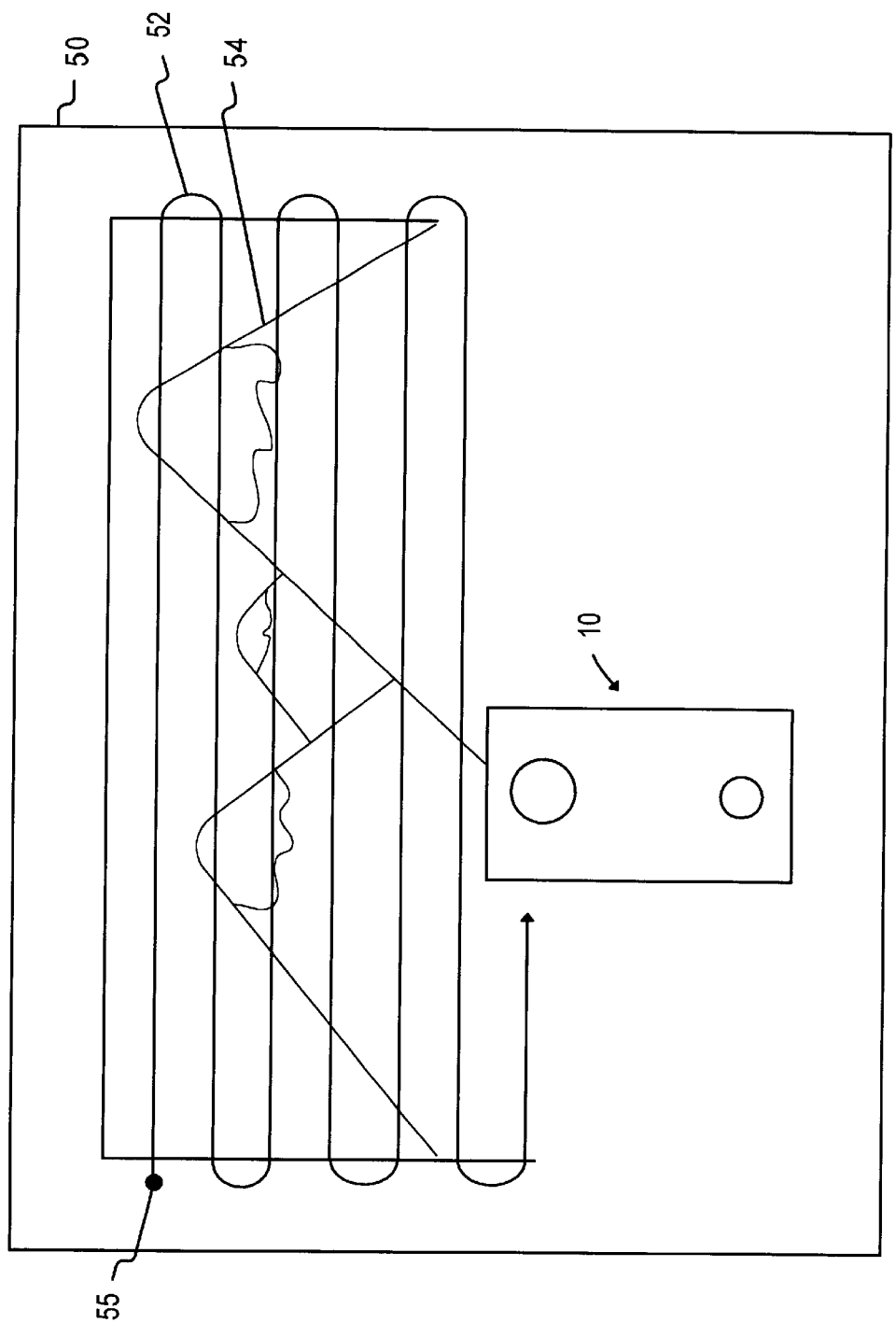
FIG. 4 is a perspective view of the digital camera following a meandering path on a printing medium in accordance with the invention.
Figure 5:
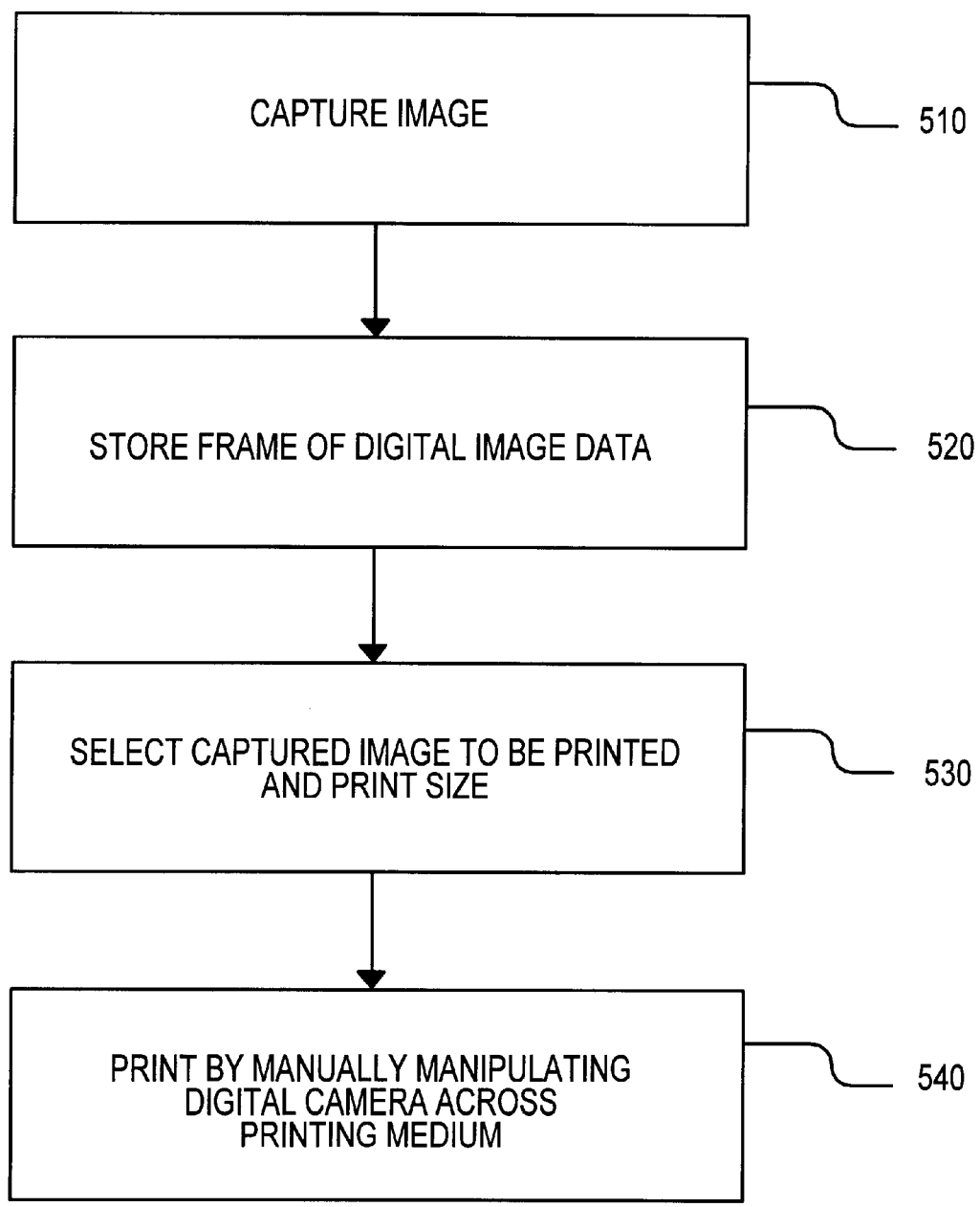
FIG. 5 is a flow diagram of a method of capturing an image of a subject and printing the captured image in accordance with the invention.

The bottom of the print-capable digital camera 10 is shown in FIG. 3, illustrating the inkjet printing head 14 and the two trackballs 16 and 18 which were described with reference to FIG. 1. FIG. 4 shows the print-capable digital camera 10 in the incomplete stage of the printing process in accordance with the present invention. The print-capable digital camera 10 has taken a meandering path 52 beginning from a point 55 to print an image of a mountain scene 54 onto a recording medium 50.

The printing operation of the printable digital camera 10 will be described with references to FIGS. 1, 2, and 4. Once the captured image represented by the frame of digital image data has been stored in the memory 38 as described above, the printable digital camera 10 is ready to print the captured image onto the printing medium 50. Using the control interface 47, the operator selects the captured image to be printed and a print size. Print size selections may vary from a high resolution, small scale choice to a low resolution, large scale choice. The recording medium 50 may be a regular paper, an inkjet-specific paper, a glossy photographic paper, or even a surface of the operator's forearm.

After the selection of the print size, the printable digital camera 10 is placed on the printing medium 50 such that the inkjet printing head 14 is at a desired starting point on the printing medium 50. The desired starting point could be where the operator wants the upper left corner of the image to be printed on the printing medium 50. However, the desired starting point could be any place on the printing medium 50, as long as the print-capable digital camera 10 is programmed to know where that starting point is situated in respect to the image to be printed. In FIG. 4, the starting point is the point 55 which is located just left of the upper left corner of the partially printed image.

The print-capable digital camera 10 begins to print when the print button 24 is activated and the trackballs 16 and 18 start to rotate. The depression of the print button triggers the digital signal processing circuitry 36 to retrieve the frame of digital image data that is to be printed from the memory 38. The frame of digital image data is then converted into print data by the printer driver 35 in order to drive the inkjet cartridge 44. Depending on the location of the printable digital camera 10 with respect to the starting point, a particular portion of the print data is sent to the inkjet cartridge 44. The location of the print-capable digital camera 10 is determined by location data provided by the trackball assemblies 46 and 48 as the digital camera is moved along the surface of the medium. Once the print data is received, the inkjet cartridge 44 operates in a conventional manner to deliver droplets of color ink onto the printing medium 50 using four jets with cyan, magenta, yellow and black inks.

As the print-capable digital camera 10 travels across the printing medium 50, the trackballs 16 and 18 of the trackball assemblies 46 and 48 rotate. The rotations of the trackballs 16 and 18 are monitored and used to generate navigation data, which is sent to the digital signal processing circuitry 36 to determine the position of the print-capable digital camera 10 in real time or, more importantly, the position of the inkjet printing head 14 with respect to the starting point.

The use of trackballs to track movements of a device is known. For example, a typical computer mouse has a single trackball for tracking the computer mouse. The movement information of the computer mouse is utilized to maneuver a cursor on a computer monitor. However, using a single trackball method of the computer mouse only provides two-directional information of the print-capable digital camera 10, i.e., movement in horizontal and vertical directions. If the angle of attack of the digital camera during the printing process changes because the digital camera is tilted by the user, this information cannot be easily acquired using a single trackball. The present invention could operate with only a single trackball, as long as the digital camera 10 is positioned fairly vertical during the printing process as shown in FIG. 4, or if the trackball is attached in a manner that permits detection of rotational movement of the digital camera 10. However, the rotational movement would be difficult to detect using a single trackball due to slippage of the trackball if the digital camera 10 is being pivoted with the trackball in the center. The preferred embodiment is to have two trackballs to acquire information on the change of the angle of attack.

Since the movement of the digital camera 10 is constantly being tracked, the path taken to print the captured image is immaterial, as long as the entire surface region on which the printed image is to be printed is scanned. For example, the free-hand meandering path 52 of FIG. 4 would have to be very precise if the digital camera 10 was printing in a traditional inkjet printing method. That is, horizontal paths of the meandering path 52 would have to be perfectly straight and evenly spaced. However, since the digital camera 10 is monitoring its position in real time, the digital camera 10 can retrace and cover areas that were missed during the initial pass with the inkjet printing head 14. When retracing an area that was already printed, the digital camera 10 preferably does not print. The segments of print data are marked or are discarded as each is used in printing a segment of the image, thereby minimizing the amount of ink that is used. However, in another embodiment, the printing of image segments is duplicated when the free-hand movement of the digital camera causes portions of the recording medium to be overlapped.

Due to potential smearing of freshly deposited ink by contact with the trackballs 16 and 18, the ideal path of the digital camera 10 during printing is the one illustrated in FIG. 4 as the meandering path 52. The arrangement of the horizontal paths should minimize the overlap of the inkjet printing head with a previous horizontal path. This ensures that all the areas of the printed image are properly covered, but minimizes any adverse effects of overlapping print.

The printing process is completed when the captured image is fully printed on the print medium 50. The digital camera 10 is now ready to print the same or another captured image on a different print medium or to capture another new image.

The method of capturing an image of a subject and printing the captured image in accordance with the invention will be described with reference to FIGS. 1, 2, 3, and 5. At step 510 in FIG. 5, an image is captured by directing the optical lens 12 at the subject of interest and activating the image capturing device of the print-capable digital camera 10. The captured image is converted into a frame of digital image data by the photosensor array 32 and the analog-to-digital circuitry 34 within the ASIC 30. The frame of digital image data is enhanced and compressed by the digital signal processing circuitry 36.

The frame of digital image data is stored in the memory 38 at step 520. The memory 38 is preferably fabricated within the ASIC 30, but may be on a separate integrated chip. Alternatively or additionally, the memory 38 may be designed within a detachable memory card which can be removed and interfaced with a host computer for viewing, editing, and printing.

At step 530, the captured image to be printed is selected by the operator using the control interface 47. The print size is also selected by the operator utilizing the control interface 47.

Printing the captured image occurs during step 540. Printing takes place when the print button 24 is activated and the trackballs 16 and 18 are rolling as a result of free-hand movement of the camera while the trackballs are in contact with a print medium 50. Initially, the inkjet printing head 14 of the printable digital camera 10 is placed on a starting point on a print medium 50. The digital camera 10 is manually manipulated across the print medium 50, keeping the trackballs 16 and 18 in constant contact with the print medium 50. As described above, the activation of the print button 24 and the movements of the trackballs 16 and 18 signal the electrical components of the digital camera to start printing. As the digital camera 10 travels on the recording medium 50, the trackball assemblies 46 and 48 constantly monitor the navigation of the digital camera 10 by generating location data in real time. The location data is utilized by the digital signal processing circuitry 36 to drive the inkjet cartridge 44 to print the corresponding segment of the captured image with respect to the location of the digital camera 10 on the print medium 50. The inkjet printing head 14 is scanned across the print medium 50 until the entire image is printed on the print medium 50.

The implementation of step 540 of printing a captured image requires the dynamic arrangement of segments of print data in response to receiving the navigation information. This can be carried out by using the digital signal processing circuitry 36 in FIG. 2 to selectively transfer segments of image data from memory 38 to the printer driver 35. Alternatively, the printer driver may be controlled to selectively convert segments of the image data to print data that is compatible with the inkjet cartridge 44. As a third alternative, the print data from the printer driver 35 is collectively stored in a buffer memory, not shown, and the print data is selectively extracted from the buffer memory in a sequence dictated by the navigation information.

While the print device is shown in FIG. 2 as being an inkjet cartridge 44, other techniques for printing the image may be utilized. Moreover, print-forming materials other than ink may be employed without diverging from the invention.

The digital camera 10 has been described as being a still image camera. However, the print capability described above may be added to a camera that captures motion as digital data. A frame from a camcorder may then be printed in the manner described above.

The use of trackball assemblies 46 and 48 may be replaced with other mechanical devices. As an example, a roller may be substituted and the roller may be limited to movement of the digital camera in one direction along the surface on which an image is printed. In this embodiment, the inkjet cartridge 44 may be mounted onto a carriage that allows movement of the printhead in a direction perpendicular to the direction of camera movement. A concern with this implementation is that the motor that moves the inkjet cartridge perpendicular to the movement of the camera will quickly deplete the charge of the battery 42.

As an alternative to the mechanical tracking mechanism, an optical approach may be utilized. U.S. Pat. No. 5,686,720 to Tullis, which is assigned to the assignee of the present invention and is incorporated by reference, describes a scanning device for simultaneously acquiring image and navigation information. A hand-held scanning device is moved relative to a document having an image to be captured. Simultaneously, one or more optical sensors are used to view features on the scanned document and to generate navigation information. This same approach may be used in the printing process of FIG. 5. In a sophisticated application of this approach, the features that are imaged and used to determine position information may be paper fibers or illumination patterns formed by highly reflective surface features and shadowed areas between raised surface features. In a less sophisticated application, the features that are imaged may be reference features, such as graph paper lines on the surface to which the image is to be printed.

Referring to FIG. 2, the trackball assemblies 46 and 48 may be replaced with a navigation sensor that is thirty-two pixels by sixty-four pixels. Preferably, there are two such navigation sensors. A less desirable alternative is to use the existing optical lens 12 and imaging array 32, but this requires that the inkjet cartridge 44 be moved to the forward surface of the digital camera 10. The concepts of the optical approach can be described with reference to FIG. 6. A reference frame 62 of a surface on which an image is to be printed is shown as having a T-shaped feature 64. The size of the reference frame depends upon factors such as the maximum scanning speed of the digital camera, the dominant spatial frequencies of the image of the structural features, and the image resolution of the navigation sensor. A practical size of the reference frame for a navigation sensor that is thirty-two pixels by sixty-four pixels is 24×56 pixels.

At a later time (dt), the navigation sensor acquires a sample frame 66 of the surface on which the image is being printed. The sample frame 66 is acquired after the digital camera 10 has been-displaced with respect to the position in which frame 62 was acquired. The duration dt is preferably set such that the relative displacement of the T-shaped feature 64 is less than one pixel of the navigation sensor and the velocity of translation of the scanning device. An acceptable time period is 50 $\mu$s for velocities of 0.45 meters/sec at 600 dpi.

Figure 6:
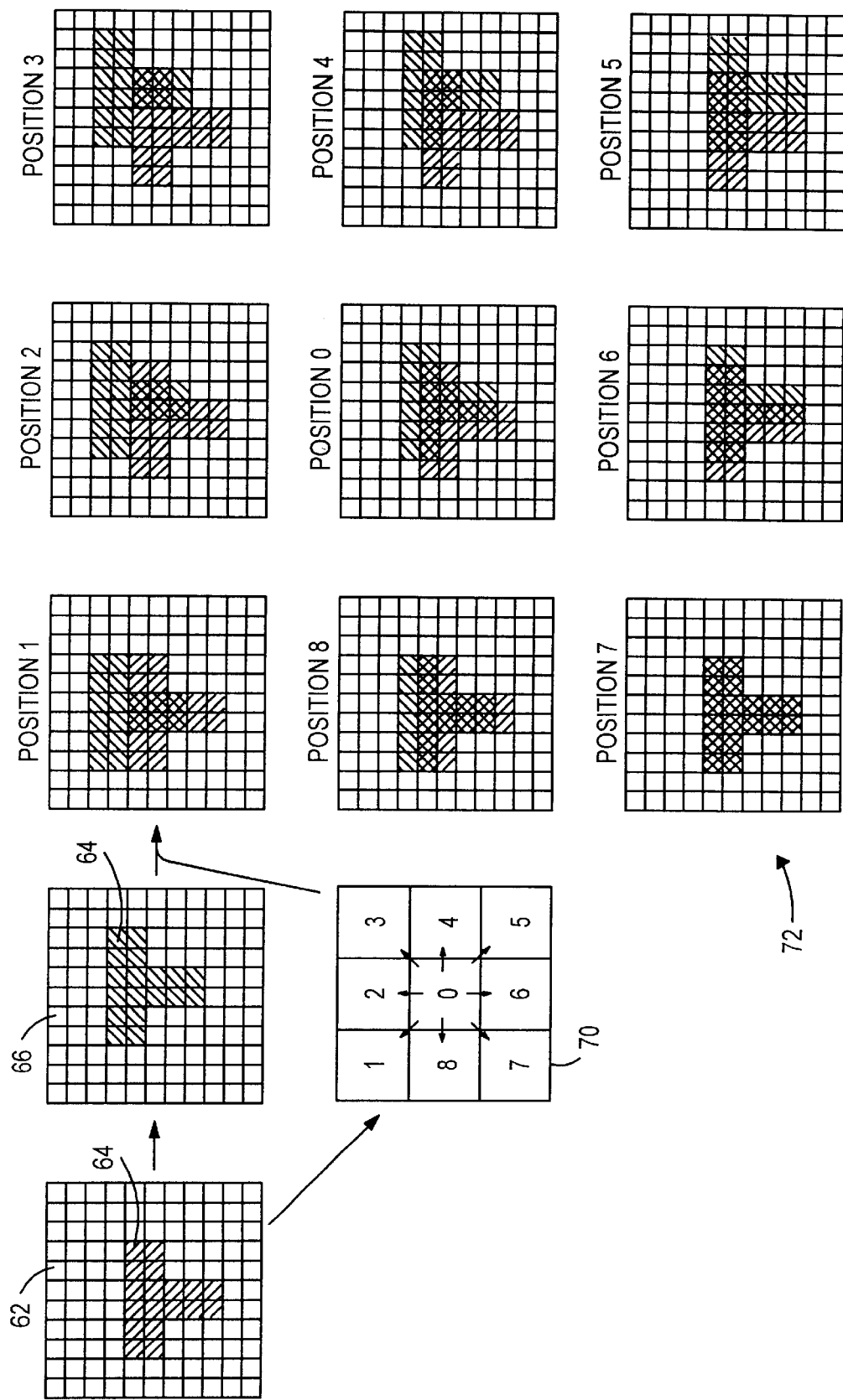
FIG. 6 is a conceptual representation of generating navigation information using an optical approach.

If the digital camera 10 has moved during the time period between acquiring the reference frame 62 and the time at which the sample frame 66 is acquired, the first and second images of the T-shaped feature will be ones in which the feature has shifted. While the preferred embodiment is one in which dt is less than the time that allows a full-pixel movement, the schematic representation of FIG. 6 shows the feature 64 as having shifted upwardly and to the right by one pixel. The full-pixel shift is assumed only to simplify the representation.

Element 70 in FIG. 6 represents a sequential shifting of the pixel values of frame 62 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames shown in FIG. 6. The position frame designated as "Position 0" does not include a shift, so that the result Is merely a combination of frames 66 and 62. "Position 7" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in the earlier-acquired reference frame 62, which implies that the digital camera has moved leftwardly and downwardly during the time dt.

An advantage of the optical approach is that it may be possible to temporarily remove the digital camera from being directly adjacent to the surface on which the image is to be printed without adversely affecting the printing process. That is, the printing process may be interrupted. The imaging of a particular feature allows the process to be performed in two steps, since correction may be achieved using a previously imaged surface feature as a reference point. On the other hand, the application in which trackball assemblies are used for generating the navigation information requires that the trackballs be precisely reseated if the printing process is temporarily halted.

What is claimed is:

1. An electronic imaging and printing apparatus comprising:
    a camera housing;
    imaging means integral with said camera housing for defining a field of vision and selectively generating a frame of digital image data representative of subject matter within said field of vision;
    camera-position tracking means located at an exterior surface of said camera housing for generating location data that is responsive to movement of said camera housing relative to a print medium during a printing process, said camera-position tracking means including a pair of trackballs;
    processor means located within said camera housing for converting said frame of digital image data into print data and dynamically arranging side-by-side segments of said print data in response to receiving said location data during said printing process, said processor means being cooperative with said pair of trackballs to track movement of said camera housing in two perpendicular axes within a plane aligned with said print medium and to track variations in an angle of said camera housing relative to a direction that is perpendicular to said plane, said processor means being responsive to said tracking of said movement and said tracking of said angle with respect to dynamically arranging said print data; and
    printing means having a supply of print-forming matter for forming an image on said print medium in response to receiving said dynamic arrangement of said print data from said processor means, said printing means being configured to deposit said print-forming matter as said camera housing is moved in a direction of one of said segments.

2. The apparatus of claim 1 wherein said camera-position tracking means includes circuitry having an input connected to said pair of trackballs and having an output signal indicative of said movement of said camera housing within an X,Y co-ordinate system.

3. The apparatus of claim 1 wherein said printing means includes an inkjet cartridge and said supply of print-forming matter is ink within said inkjet cartridge.

4. The apparatus of claim 3 wherein said inkjet cartridge contains a plurality of colors inks.

5. The apparatus of claim 1 wherein said imaging means includes a photosensor array and said processor means is a digital signal processing circuitry, said photosensor array and said digital signal processing circuitry being incorporated into an application specific integrated circuit (ASIC).

6. The apparatus of claim 5 wherein said application specific integrated circuit also includes memory, timing control cicuitry and analog-to-digital cicuitry.

7. The apparatus of claim 5 wherein said application specific integrated circuit utilizes CMOS techonology.

8. The apparatus of claim 1 further comprising memory having an input that is connected to said imaging means to store said frame of digital image data.

9. A method of printing an image utilizing a hand-held camera with printing capability comprising steps of:
    capturing a frame of digital image data utilizing an imaging device;
    storing said frame of image data into internal memory of said hand-held camera;
    manually moving said hand-held camera adjacent to a surface on which a printed image is to be formed;
    tracking positions of said hand-held camera relative to said surface and angles of said hand-held camera relative to a direction that is perpendicular to said surface, including generating position data indicative of said relative positions and said relative angles; and
    depositing print-forming matter onto said surface in a sequence determined by said position data and said meandering path such that a composite printed image is representative of said frame of image data, including limiting said depositing to a single deposition of said print-forming matter onto any portion of said surface, thereby preventing overlapping depositions onto portions of said surface that are overlapped as said hand-held camera is moved along said meandering path.

10. The method of claim 9 wherein said step of manually moving said hand-held camera is executed in a manner free of physical constraints.

11. The method of claim 9 wherein said step of tracking positions of said hand-held camera includes receiving signals from a trackball.

12. The method of claim 9 wherein said step of capturing said frame of image data includes receiving signals from an array of optoelectrical elements.

13. The method of claim 9 wherein said step of depositing print-forming matter includes utilizing inkjet printer techniques.

* * * * *